Figure 1:
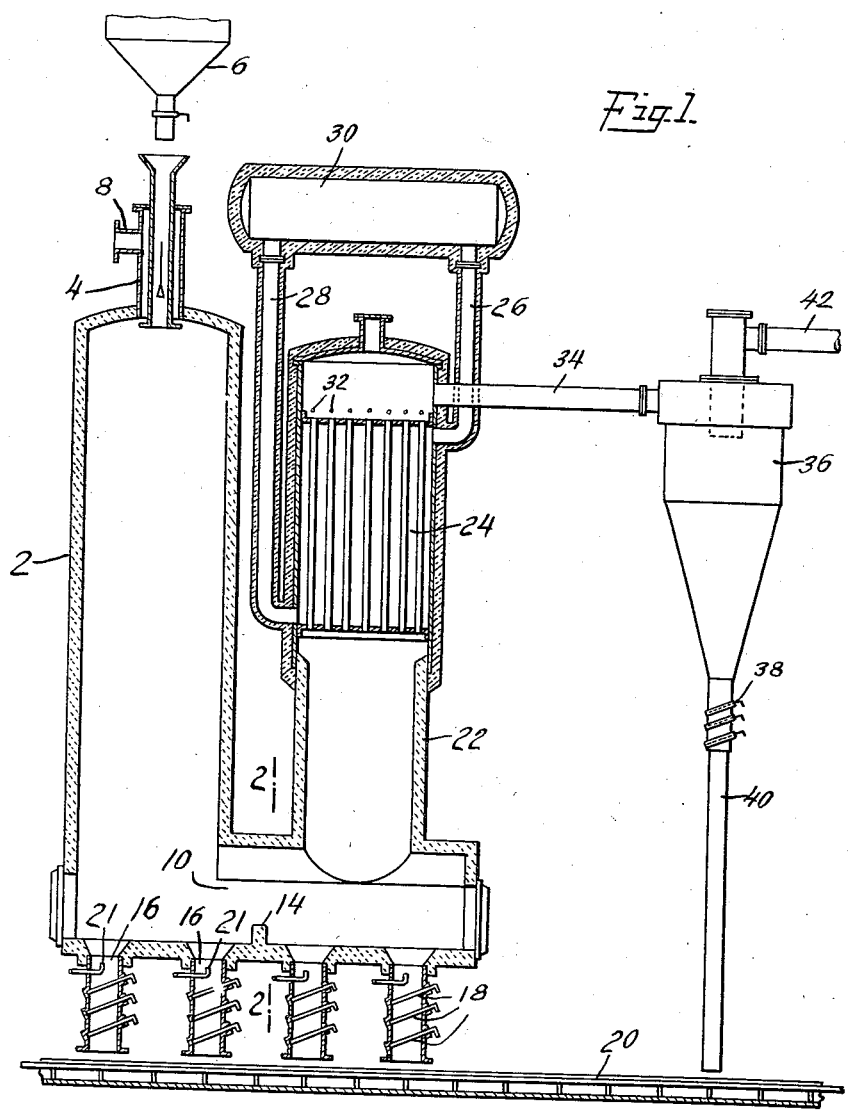

July 6, 1937.  C. A. MacDONALD  2,086,232
PRODUCTION OF SULPHUR DIOXIDE
Original Filed June 5, 1931

INVENTOR
Charles A. MacDonald
BY
ATTORNEY

Patented July 6, 1937

2,086,232

UNITED STATES PATENT OFFICE 2,086,232

PRODUCTION OF SULPHUR DIOXIDE

Charles A. MacDonald, New York, N. Y., assignor to General Chemical Company, New York, N. Y., a corporation of New York Original application June 5, 1931, Serial No. 542,269. Divided and this application October 9, 1934, Serial No. 747,487

4 Claims. (Cl. 75—9)

This application is a division of my co-pending application Serial No. 542,269, filed June 5, 1931, which has issued as Patent No. 1,985,902, granted Jan. 1, 1935.

My invention relates to processes for removing metal oxide cinder and dust from sulphur dioxide gases produced by burning or roasting sulphide ores, flotation concentrates and similar finely divided combustible materials in suspension.

Sulphur dioxide is produced from sulphide ores and particularly pyrites, flotation concentrates and the like by burning the materials in finely divided form and while in suspension in a shaft furnace such as that disclosed in the United States patent to Cordy et al. 1,758,188, patented May 13, 1930. In the shaft furnace described in said patent, finely divided sulphide ores and air are introduced into the top of a furnace which is in the form of a vertical column heated to a high temperature and the ore and air together with the sulphur dioxide and resulting products of combustion pass downwardly to an outlet communicating with the lower portion of the furnace. The gases then pass through a dust collecting chamber wherein dust entrained therein is deposited. However, the gases leaving the dust collecting chamber ordinarily still contain substantial amounts of finely divided dust in suspension and therefore the gases must be treated further to remove the suspended dust therefrom. The dust produced consists largely of metal oxides, for example iron oxide, when the material burned is pyrites. The dust recovered, therefore, constitutes a valuable by-product from the operation.

It has been proposed to pass the hot gases from the dust collecting chamber through a cyclone separator for removing suspended dust from the gases after they have been passed through the dust collecting chamber. However, the gases leaving the furnace and passing from the dust-collecting chamber are ordinarily at a temperature of about 1700° to 2000° F. and therefore in practice it is found that cyclone separators and similar apparatus used for separating the finely divided and suspended dust must be made of special and expensive materials, such as chrome steel and must be of very large capacity in order to accommodate the large volume of gases passed therethrough. It is also found in some instances that the dust collecting in the collecting chamber has not been completely burned and therefore contains substantial amounts of sulphur. This unburned sulphur represents a loss in the amount of sulphur dioxide produced and increases the sulphur content of the dust rendering the same unsuitable for further use or of inferior quality.

In accordance with my invention the disadvantages heretofore encountered in the treatment of sulphide ore, flotation concentrates and the like in a shaft furnace are overcome and the cost and maintenance of the apparatus used is comparatively low. In practicing the process of my invention the gases leaving the dust-collecting chamber and containing finely divided dust in suspension are passed into contact with a heat exchange device such as a tubular boiler whereby the volume and velocity of the gases are reduced and dust carried by the gases is deposited. The heat exchange device is preferably located above the dust-collecting chamber so that the dust thus deposited falls back into the dust-collecting chamber and is removed with the dust deposited by the gases as they pass through the dust-collecting chamber. The gases, after being passed in contact with the heat exchange device, are of relatively low temperatures, say 500° to 600° F. and are correspondingly decreased in volume and velocity. The cooled gases are then passed into a cyclone separator where any remaining dust is separated from the gases and the cooled gases substantially free from dust are passed to further apparatus for utilizing the $SO_2$ produced for manufacturing sulphuric acid or for other purposes.

Supplemental air is introduced near the bottom of the dust collecting chamber for the purpose of aiding the combustion of any incompletely oxidized material depositing in the chamber, so as to more completely desulphurize the material prior to its discharge from the chamber.

Among the objects of my invention are to provide an improved method for removing dust from sulphur dioxide and the products of combustion produced in burning finely divided sulphide ores, flotation concentrates and similar combustible materials in suspension, to utilize the heat contained in said products of combustion in producing steam and to reduce the cost and increase the efficiency of the apparatus employed.

A further object of the invention is to effect substantially complete combustion of unoxidized materials introduced into the shaft furnace and to reduce the sulphur content of the metallic oxide dust formed in the operation.

These and other objects and features of my invention will appear from the following description thereof in which reference is made to the accompanying figures of the drawing illustrating a preferred embodiment of my invention.

Figure 2:
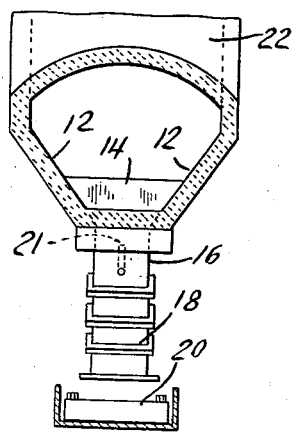

In the drawing,

Fig. 1 is a vertical sectional view of the preferred form of my invention, parts of the apparatus being shown in full lines; and Fig. 2 is a vertical sectional view taken at right angles to Fig. 1 on the line 2—2.

In the form of the invention illustrated in the drawing, a shaft furnace 2 is provided with suitable feeding mechanism 4 for introducing air and the sulphide ore, flotation concentrates or other material to be burned into the furnace. The feeding mechanism used may be of any suitable type such as that described in the patent to Cordy et al. referred to above, whereby part of the air introduced with the sulphide ore serves to prevent the ore from coming into contact with the walls of the furnace. The ore is supplied to the feeding mechanism from a hopper 6 and the air for supporting combustion of the ore is supplied to the feeding mechanism through the conduit 8.

The lower portion of the furnace 2 communicates with a horizontally extending cinder and dust collecting chamber 10 through which the sulphur dioxide and products of combustion from the furnace are passed. The chamber 10 is provided with sloping side 12 onto which the dust and burned ore are deposited from the gases passing through the chamber. A baffle member 14 extends across the lower portion of the chamber to increase the turbulence of the gases passing therethrough and aid in the removal of dust from the gases. The cinder and dust collecting on the bottom and sloping sides of the chamber 10 passes into the chutes 16 and is removed through the triple doors 18. The doors 18 serve to maintain the gases in the apparatus under substantially constant pressure and permit operation of the apparatus under positive pressure, if desired. The cinder and dust thus removed from the gases is passed through the chutes 16 onto the conveyor 20 and may be transported to storage bins or apparatus for using the same.

In some instances the dust or material deposited in the chamber 10 is incompletely burned so that the resulting metallic oxide contains sulphur which decreases the value of the dust materially. I therefore introduce supplemental air into the dust collecting chamber to insure complete combustion of the dust collected in the chamber 10. For this purpose air inlets 21 are located in the chutes 16 or elsewhere in the dust-collecting chamber 10 for introducing air into the chamber. The air thus introduced comes into contact with the dust depositing in the chamber, insuring complete combustion of this material prior to its removal through the chutes 16.

The gases passing from the horizontal chamber 10 and containing finely divided material in suspension, are then treated to remove additional dust therefrom. For this purpose the end of the chamber 10 remote from the furnace is provided with a portion 22 extending vertically from the chamber and communicating with a suitable heat exchange device 24 such as a tubular boiler. The boiler 24 may be either a water tube boiler or a fire tube boiler and is of sufficient capacity to cool the gases and reduce the volume and velocity thereof so that dust and particles carried in suspension in the gases are deposited from the gases. The boiler 24 is so positioned with reference to the chamber 10, that dust deposited from the gases in cooling the same falls back into the chamber 10.

The boiler 24 is connected by suitable pipes 26 and 28 to a steam chamber 30 from which steam can be withdrawn for use in the plant in which the apparatus is employed. The upper portion of the boiler above the tubes may also be provided with suitable soot blowing devices 32.

The upper end of the vertical portion 22 of the chamber 10 is provided with a gas offtake 34 through which the cooled gases are passed to a cyclone separator 36 for removing any remaining dust from the gases. The dust separated from the gases in the cyclone separator is removed through triple doors 38 and the chute 40 and is carried away by the conveyor 20. The cooled and cleaned gases leave the separator through the pipe 42 connected to the top of the separator and can be used for the production of sulphuric acid or for the manufacture of paper pulp or for other purposes.

In operating the apparatus described above, the ore and air are introduced into the furnace 2 in the desired proportion for effecting combustion of the material. These proportions will vary with the character and composition of the ore or flotation concentrate or other material being burned. Both the air and ore are first dried and the furnace into which the ore and air are introduced is initially heated to a high temperature. The ore entering the furnace is thereby ignited and burned to produce sulphur dioxide leaving a residue of metallic oxides in the form of cinder and dust. The gases produced together with the material being burned pass downwardly through the furnace and into the horizontally extending dust collecting chamber 10. The bulk of the cinder and dust contained in the gases is removed in the chamber 10 and the supplemental air introduced through the air inlets 21 aids in completing the combustion of any incompletely oxidized material depositing in the chamber 10.

The gases containing some suspended dust then pass upwardly from the chamber 10 through the vertical portion 22 and over the heat exchange device 24. The gases leaving the chamber 10 and passing into contact with the heat exchange device are ordinarily at a temperature from 1700° to 2000° F. In passing over the heat exchange device, the gases are reduced in temperature to approximately 500° to 600° F. giving up their heat to the water in the heat exchange device and converting the same into steam. The gases are thus reduced in volume and the velocity thereof is correspondingly reduced so that dust carried in suspension by the gases is deposited and falls back into the dust collecting chamber 10 and is removed with that dust previously deposited in the chamber 10 as the gases pass horizontally therethrough.

After passing over the heat exchange device the cooled gases are subjected to further treatment to remove additional dust and finely divided material therefrom and preferably are passed through a cyclone separator wherein the dust is deposited and the cleaned cooled gases pass from the cyclone separator to suitable apparatus for producing sulphuric acid, manufacturing paper or for other purposes. The dust separated from the gases and collecting in the chamber 10 and in the cyclone separator 36 consists very largely of metallic oxides, such as iron oxide if the ore used is pyrites, and this dust is valuable as a by-product. The dust is therefore removed from the dust collecting chamber and cyclone separator and carried by the conveyor 20 to a storage bin, furnace or other means for storing or using the same.

The combination of apparatus elements herein described is of particular value in that the gases are cooled prior to their passage through the cyclone separator and as a result of the reduced volume and temperature of the gases the apparatus may be constructed of comparatively cheap materials and is relatively small in size as compared with the apparatus that is necessary when the gases are not cooled and partially cleaned prior to their passage into the cyclone separator or other dust removing apparatus. The apparatus therefore is less expensive to construct and maintain than similar apparatus heretofore proposed for this purpose.

Since certain changes may be made in carrying out the above process without departing from the scope of the invention, it is intended that all matter contained in the above description shall be interpreted as illustrative and not in a limiting sense.

I claim:

1. The method for roasting metal sulphide fines to produce sulphur dioxide which comprises introducing sulphide fines into a combustion zone, burning said fines while in gaseous suspension in oxidizing gas to produce relatively highly heated sulphur dioxide gases, solid metal oxide cinder and dust, passing the hot gases while heated to high combustion temperatures through a relatively elongated dust separating zone to separate the sulphur dioxide gases from the bulk of the cinder and dust, introducing supplemental oxidizing gas into said separating zone to aid in combustion of residual sulphur contained in said cinder and dust, cooling said gases to relatively low temperatures in the neighborhood of 500–600° F. while flowing the gases vertically to substantially reduce the volume and velocity of the gases and to deposit cinder and dust from the same, returning to said separating zone the cinder and dust thus deposited during the cooling operation, and then removing residual dust from said gases after said cooling operation.

2. The method for roasting metal sulphide fines to produce sulphur dioxide which comprises introducing sulphide fines into a combustion zone, burning said fines while in gaseous suspension in oxidizing gas to produce relatively highly heated sulphur dioxide gases, solid metal oxide cinder and dust, passing the hot gases while heated to high combustion temperatures through a dust separating zone to separate the sulphur dioxide gases from the bulk of the cinder and dust, introducing supplemental oxidizing gas into said separating zone to aid in combustion of residual sulphur contained in said cinder and dust, cooling said gases several hundred degrees to substantially reduce the volume and velocity of the gases and to deposit cinder and dust from the same, and then removing residual dust from said gases after the cooling operation.

3. The method for roasting metal sulphide fines to produce sulphur dioxide which comprises introducing sulphide fines into a combustion zone, burning said fines while in gaseous suspension in oxidizing gas to produce hot sulphur dioxide gases heated to temperatures of the order of 1700–2000° F., solid metal oxide cinder and dust, passing the hot gases while heated to high combustion temperatures through a dust separating zone of dimensions such that during passage of the gases through said zone separation of the sulphur dioxide gases from the bulk of the cinder and dust is effected, then flowing said gases vertically in indirect heat exchange relation with water, regulating the heat transfer from the hot gases to the water so as to cool the gases to relatively low temperatures of the order of 500–600° F. to thereby effect deposition of cinder and dust from the gases, to recover heat extracted from the gases in utilizable form as steam, and to substantially reduce the volume, velocity and temperature of the gases to such extent as to make possible subsequent removal from the gas of residual dust by means of a relatively small non-special alloy metallic dust separator, and then removing residual dust from said gases after said cooling operation by passing said gases through a relatively small non-special alloy metallic dust separator.

4. The method for roasting metal sulphide fines to produce sulphur dioxide which comprises introducing sulphide fines into a major combustion zone, burning said fines while in gaseous suspension in oxidizing gas to produce relatively highly heated sulphur dioxide gases and relatively discrete, free-flowing solid metal oxide cinder and dust, withdrawing said gases from said major combustion zone and passing the hot gases while containing at least a substantial amount of cinder and dust and heated to high combustion temperatures through a dust separating zone in which temperatures approximating those of the combustion zone prevail, and effecting in said zone deposition of the bulk of the cinder and some dust and separation therefrom of sulphur dioxide gas, introducing through the deposited cinder in said separating zone a stream of supplemental oxidizing gas in close proximity to the cinder to aid in combustion of residual sulphur contained in said cinder and dust, and recovering sulphur dioxide gases.

CHARLES A. MacDONALD.